(12) United States Patent
Niiho et al.

(10) Patent No.: US 7,660,027 B2
(45) Date of Patent: Feb. 9, 2010

(54) OPTICAL MODULATOR AND MODULATION METHOD

(75) Inventors: Tsutomu Niiho, Osaka (JP); Kouichi Masuda, Osaka (JP); Masaru Fuse, Osaka (JP); Fumio Fujisaki, Kanagawa (JP); Kuniharu Itakura, Kanagawa (JP); Tomoaki Ohira, Osaka (JP)

(73) Assignee: Panasonic Corporation, Osaka (JP)

( * ) Notice: Subject to any disclaimer, the term of this patent is extended or adjusted under 35 U.S.C. 154(b) by 154 days.

(21) Appl. No.: 11/935,744

(22) Filed: Nov. 6, 2007

(65) Prior Publication Data

US 2008/0106780 A1 May 8, 2008

(30) Foreign Application Priority Data

Nov. 8, 2006 (JP) ............................. 2006-302344

(51) Int. Cl.
*G02B 1/07* (2006.01)
(52) U.S. Cl. ..................... 359/259; 359/238; 359/245; 385/2; 385/3
(58) Field of Classification Search ................ 359/259, 359/238, 239, 245; 385/2, 3, 4
See application file for complete search history.

(56) References Cited

U.S. PATENT DOCUMENTS 7,116,460 B2 * 10/2006 Griffin ...................... 359/245

FOREIGN PATENT DOCUMENTS

JP 2004-037695 2/2004

* cited by examiner

*Primary Examiner*—Timothy J Thompson
(74) *Attorney, Agent, or Firm*—Wenderoth, Lind & Ponack, L.L.P.

(57) ABSTRACT

An optical modulator comprises an electrode 21 which applies to an optical waveguides 12 of a Mach-Zehnder type optical interference system a first electric signal based on an alternating current signal S1 and a direct current bias V1, an electrode 22 which applies to an optical waveguide 13 of the Mach-Zehnder type optical interference system a second electric signal based on an alternating current signal S2 and a direct current bias V2, and a bias setting section 41 which sets average direct current levels of the first and second electric signals based on signal frequency information D1 which indicates a magnitude relation between a maximum frequency of the alternating current signal S1 and a maximum frequency of the alternating current signal S2.

14 Claims, 15 Drawing Sheets

OPTICAL MODULATOR AND MODULATION METHOD

BACKGROUND OF THE INVENTION

1. Field of the Invention

The present invention relates to an optical modulator and a modulation method for multiplexing a plurality of alternating current signals with different frequencies using an electro-optical effect.

2. Description of the Background Art

Recently, with the dissemination of an optical fiber network, there has been an attempt to perform long-distance transmission of modulation signals of a mobile phone, CATV, a wireless LAN device, and the like with optical fiber as well as high-speed data communication with a baseband. An SCM (Sub-Carrier Multiplex) technique is a technique in which a plurality of modulation signals of different modulation formats are frequency-multiplexed and optically transmitted, and signals having a plurality of channels and a plurality of modulation formats can be optically transmitted together similarly to CATV. In addition, recently, researches on optical transmission of signals of a millimeter wave band by the SCM technique have been made.

In the case of performing optical modulation for such purposes, since a wide modulation bandwidth is required, external modulation using a CW (Continuous Wave) light wave is generally used. Particularly, a lithium-niobate (LN) optical modulator is suitable for high-frequency signal transmission since the lithium-niobate (LN) optical modulator is not subject to restrictions on a modulation bandwidth with a dielectric loss.

FIG. 14 illustrates an exemplary configuration of a conventional LN optical modulator 81. Optical waveguides 101 to 104 which are formed on an LN substrate having an electro-optical effect are constructed as a Mach-Zehnder type, and have a modulating electrode 201 and a GND electrode 200. An alternating current signal S and a direct current bias V are combined by a bias tee 301, and applied to the modulating electrode 201. An optical signal which has passed through the optical waveguide 102 is phase-modulated according to the alternating current signal S, and multiplexed with an optical signal which has passes through the optical waveguide 103. An optical signal outputted from the optical wave guide 104 after multiplexing is an optical signal which is intensity-modulated according to the alternating current signal S.

In addition, a conventional LN optical modulator 82 with a different configuration which is disclosed in Japanese Laid-Open Patent Publication 2004-37695 is shown in FIG. 15. The LN optical modulator 82 is configured so that a modulating electrode 202 to which a signal is applied is used instead of the GND electrode 200 of the LN optical modulator 81 shown in FIG. 14. A phase inversion section 401 inverts a phase of the alternating current signal S applied to the electrode 201 by 180 degrees thereby to generate an alternating current signal S'. The generated alternating current signal S' is combined with a direct current bias V2, and applied to the modulating electrode 202. Such a configuration has merits such as that wavelength chirp can be small, that modulation efficiency for one electrode can be smaller, and the like in comparison to the LN optical modulator 81 shown in FIG. 14.

Meanwhile, in order to frequency-multiplex a plurality of alternating current signals using the conventional LN optical modulator, a multiplexer, a duplexer using a plurality of filters, or the like needs to be used. Also, in order to multiplex in an optical region, two optical modulators need to be connected to a cascade.

However, in the case of performing combination using a multiplexer at a stage of electrical treating, for example, a loss of about 6 dB occurs in a simplest resistance type combination, causing deterioration of CNR. Also, in the case of performing combination using a filter at the stage of electrical treating, a loss is reduced to several tenths of a dB while group delay frequency characteristics of a signal deteriorates. Particularly, in the case of a signal into which a transmission signal is frequency-modulated, the deterioration of the group delay frequency characteristics causes deterioration of distortion characteristics. Thus, a combination method using a filter is not preferable. In addition, a method of multiplexing at the stage of optical treating can obtain excellent characteristics as compared to the combination at the stage of electrical treating, but it needs to use two costly optical modulators and provides a large cost demerit.

SUMMARY OF THE INVENTION

Thus, an object of the present invention is to provide an optical modulator which can transmit a frequency-multiplexed signal without causing determination due to noise and distortion, and a modulation method performed by the optical modulator.

The present invention is directed to an optical modulator and a modulation method for outputting an optical signal which is modulated based on a plurality of alternating current signals. In order to attain the object mentioned above, the optical modulator of the present invention comprises a Mach-Zehnder type optical interference system formed on an electro-optic crystal and including first and second optical waveguides; a first electrode operable to apply to the first optical waveguide of the Mach-Zehnder type optical interference system a first electric signal based on a first alternating current signal; and a second electrode operable to apply to the second optical waveguide of the Mach-Zehnder type optical interference system a second electric signal based on a second alternating current signal having a frequency which is different from a frequency of the first alternating current signal.

Typically, the optical modulator further comprises a bias setting section operable to set average direct current levels of the first and second electric signals based on signal frequency information which indicates a magnitude relation between a maximum frequency of the first alternating current signal and a maximum frequency of the second alternating current signal, or a first direct current electrode operable to apply a direct current voltage to the first optical waveguide; a second direct current electrode operable to apply a direct current voltage to the second optical waveguide; and a bias setting section operable to set, based on signal frequency information which indicates a magnitude relation between a maximum frequency of the first alternating current signal and a maximum frequency of the second alternating current signal, an electric potential difference given to the first and second direct current electrodes. Also, the optical modulator further comprises a frequency detection section operable to detect frequencies of the first and second alternating current signals, and output values of detected frequencies as the signal frequency information to the bias setting section.

In the case where the Mach-Zehnder type optical interference system outputs an optical signal which is transmitted through a transmission path having a positive dispersion characteristic throughout the entire transmission path, and, on the other hand, the bias setting section sets (A) the average current direct levels so that a phase of an optical signal modulated by the first optical waveguide proceeds in comparison to a phase of an optical signal modulated by the second optical waveguide when the maximum frequency of the first electric signal is higher than that of the second electric signal, so that the phase of the optical signal modulated by the first optical waveguide delays in comparison to the phase of the optical signal modulated by the second optical waveguide when the maximum frequency of the first electric signal is lower than that of the second electric signal. In the case where the Mach-Zehnder type optical interference system outputs an optical signal which is transmitted through a transmission path having a negative dispersion characteristic throughout the entire transmission path, the bias setting section sets (B) the average current direct levels so that a phase of an optical signal modulated by the first optical waveguide delays in comparison to a phase of an optical signal modulated by the second optical waveguide when the maximum frequency of the first electric signal is higher than that of the second electric signal, and, on the other hand, so that the phase of the optical signal modulated by the first optical waveguide proceeds in comparison to the phase of the optical signal modulated by the second optical waveguide when the maximum frequency of the first electric signal is lower than that of the second electric signal.

Where θ1 denotes the phase of the optical signal modulated by the first optical waveguide, θ2 denotes the phase of the optical signal modulated by the second optical waveguide, and n denotes an integer number, the bias setting section set as the above (A) sets the average current direct levels so as to satisfy an equation [1] when the maximum frequency of the first electric signal is higher than that of the second electric signal, and so as to satisfy an equation [2] when the maximum frequency of the first electric signal is lower than that of the second electric signal:

$$2n\pi < \theta_1 - \theta_2 < (2n+1)\pi \quad [1]$$

$$(2n-1)\pi < \theta_1 - \theta_2 < 2n\pi. \quad [2]$$

On the other hand, the bias setting section set as the above (B) sets the average current direct levels so as to satisfy an equation [2] when the maximum frequency of the first electric signal is higher than that of the second electric signal, and so as to satisfy an equation [1] when the maximum frequency of the first electric signal is lower than that of the second electric signal:

Also, in order to attain the object mentioned above, another optical modulator of the present invention comprises a Mach-Zehnder type optical interference system; a signal switch section operable to input a first alternating current signal and a second alternating current signal, and output the first and second alternating current signals so that elements to which the first and second alternating current signals are switched; a first electrode; and a second electrode. The signal switch section switches, based on signal frequency information which indicates a magnitude relation between a maximum frequency of the first alternating current signal and a maximum frequency of the second alternating current signal, the elements to which the first and second alternating current signals are outputted. It is noted that the optical modulator may further comprise a frequency detection section operable to detect frequencies of the first and second alternating current signals, and output values of detected frequencies as the signal frequency information to the signal switch section.

Also, in order to attain the object mentioned above, another optical modulator of the present invention comprises a signal combination section operable to generate a first combined signal into which a first alternating current signal and a second alternating current signal having a frequency different from a frequency of the first alternating current signal are combined with a first ratio which is determined by signal frequency information indicating a magnitude relation between a maximum frequency of the first alternating current signal and a maximum frequency of the second alternating current signal, and a second combined signal into which the first alternating current signal and the second alternating current signal are combined with a second ratio which is reverse to the first ratio; a Mach-Zehnder type optical interference system; a first electrode; and a second electrode. It is noted that the optical modulator may further comprise a frequency detection section operable to detect frequencies of the first and second alternating current signals, and output values of detected frequencies as the signal frequency information to the frequency detection section.

According to the present invention, it is possible to transmit two electric signals having different frequencies with one optical modulator by respectively applying alternating current signals having different frequencies to two electrodes provided to two-line optical waveguide of the Mach-Zehnder type optical interference system including an optical waveguide, without causing noise and distortion due to combination of electric signals.

These and other objects, features, aspects and advantages of the present invention will become more apparent from the following detailed description of the present invention when taken in conjunction with the accompanying drawings.

DESCRIPTION OF THE PREFERRED EMBODIMENTS

The following will describe embodiments of the present invention with reference to the figures.

First Embodiment

Figure 1:
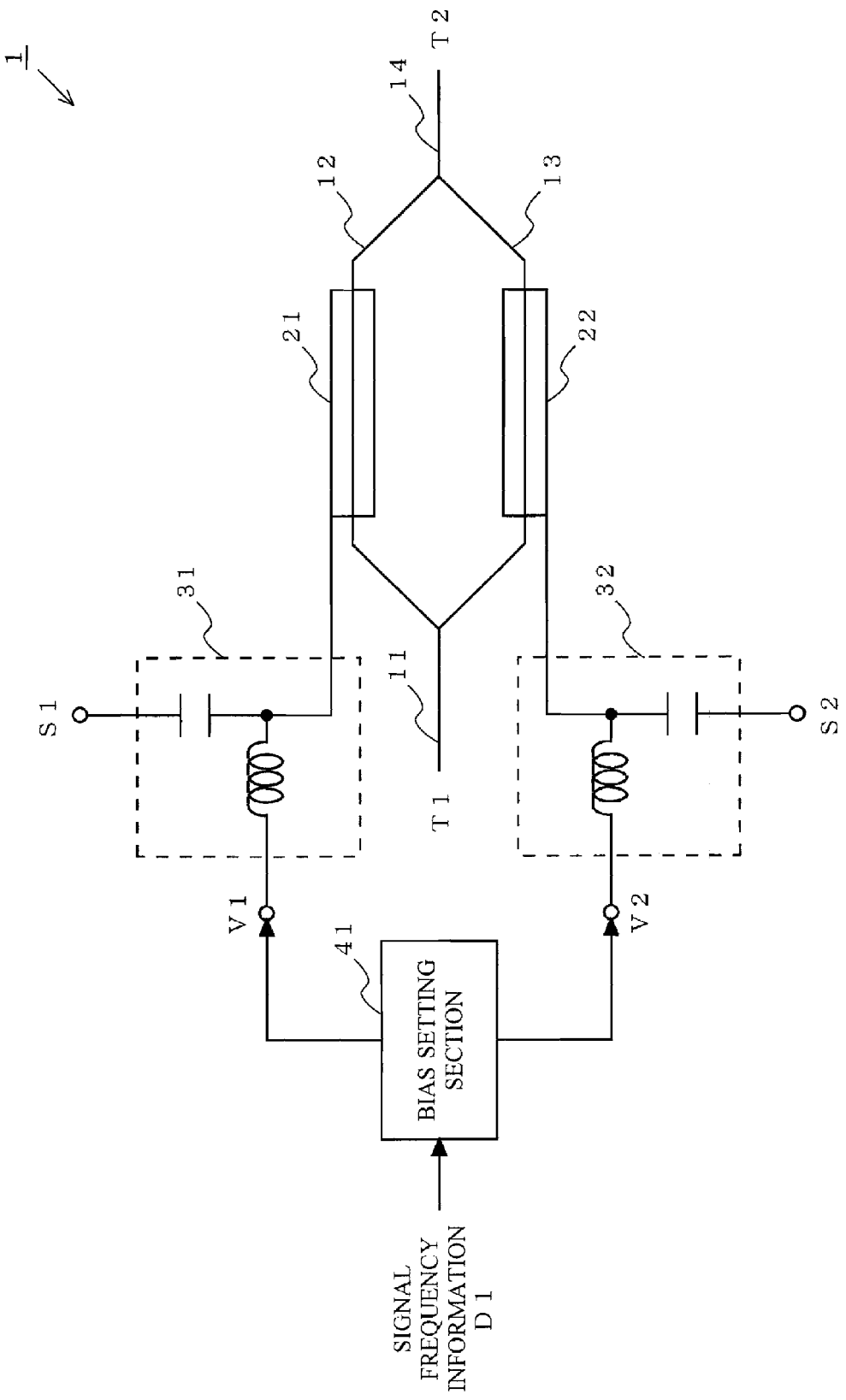
FIG. 1 illustrates a configuration of an optical modulator 1 according to a first embodiment of the present invention.

FIG. 1 illustrates a configuration of an optical modulator 1 according to a first embodiment of the present invention. The optical modulator 1 according to the first embodiment comprises optical waveguides 11 to 14, electrodes 21 and 22, bias tees 31 and 32, and a bias setting section 41. The optical waveguides 11 to 14 are formed on a substrate having an electro-optical effect, and constructed as a Mach-Zehnder type. Each of the bias tees 31 and 32 is configured so that a capacitor and an inductor are connected in a T-shape.

An optical signal T1 which is inputted to the optical waveguide 11 is distributed into two signals, which are in turn inputted to the optical waveguide 12 and the optical waveguide 13, respectively. The bias setting section 41 outputs, based on signal frequency information D1 which indicates a relation between an alternating current signal S1 and an alternating current signal S2, direct current biases V1 and V2 which are set by a later-described method. In the signal frequency information D1, a parameter indicating a magnitude relation between a maximum frequency of the alternating current signal S1 and a maximum frequency of the alternating current signal S2, numeric values of the maximum frequencies of the alternating current signals S1 and S2, and the like are used.

The bias tee 31 superimposes the inputted alternating current signal S1 and the direct current bias V1 outputted from the bias setting section 41, and applies a superimposed electric signal (S1+V1) to the electrode 21. The bias tee 32 superimposes the inputted alternating current signal S2 and the direct current bias V2 outputted from the bias setting section 41, and applies a superimposed electric signal (S2+V2) to the electrode 22. The alternating current signals S1 and S2 are modulation signals, and their frequencies are different from each other.

The electrode 21 generates, based on the electric signal (S1+V1) applied by the bias tee 31, an electric field in the optical wave guide 12 which forms one of arms of the Mach-Zehnder type optical waveguide, and changes a refractive index of the optical waveguide 12. Thus, an optical signal which passes through the optical waveguide 12 is phase-modulated. The electrode 22 generates, based on the electric signal (S2+V2) applied by the bias tee 32, an electric field in the optical waveguide 13 which forms one of arms of the Mach-Zehnder type optical waveguide, and changes a refractive index of the optical waveguide 13. Thus, an optical signal which passes through the optical waveguide 13 is phase-modulated.

The optical signals which are phase-modulated by the optical waveguides 12 and 13, respectively, are multiplexed, and outputted as an optical signal T2 from the optical waveguide 14. The optical signal T2 is inputted to an optical transmission line (not shown). It is noted that in the present embodiment, the optical signal T2 is inputted to an optical transmission line having a positive dispersion characteristic throughout the entire transmission line. As an example of the optical transmission line having the positive dispersion characteristic, the case where an optical signal of 1.55 μm band is inputted to a 1.3 μm band single mode fiber (SMF) is considered, and the SMF has a dispersion value of about 17 ps/nm/km.

As described above, the alternating current signals S1 and S2 having the different frequencies are applied to the two electrodes 21 and 22, respectively, thereby transmitting a frequency-multiplexed signal with the optical modulator 1 alone without causing deterioration of noise and distortion due to combination of electric signals.

The following will describe a setting operation performed by the bias setting section 41 in detail.

Where δ1 denotes an amount of change in refractive index of the optical waveguide 12 in applying unit voltage and δ2 denotes an amount of change in refractive index of the optical waveguide 13 in applying unit voltage, a phase change θ1 occurring to an optical signal which is outputted from the optical waveguide 12 by applying the electric signal (S1+V1), and a phase change θ2 occurring to an optical signal which is outputted from the optical waveguide 13 by applying the electric signal (S2+V2) are obtained by the following equations [3] and [4]:

$$\theta1=\delta1(S1+V1) \quad [3]$$

$$\theta2=\delta2(S2+V2). \quad [4]$$

Here, in the case where the maximum frequency of the alternating current signal S1 is higher than that of the alternating current signal S2, the direct current biases V1 and V2 are set so that the phase changes θ1 and θ2 satisfy the following equation [1]:

$$2n\pi<\theta1-\theta2<(2n+1)\pi. \quad [1]$$

It is noted that n is an integer number. Then, the above equations [3] and [4] are assigned to the equation [1] to provide the following equation [5]:

$$2n\pi<(\delta1 S1-\delta2 S2)+(\delta1 V1-\delta2 V2)<(2n+1)\pi. \quad [5]$$

For example, assuming that the alternating current signals S1 and S2 are vanishingly small and an equation, δ=δ1=δ2 is satisfied on the assumption of a general case, the direct current biases V1 and V2 may be set so as to satisfy the following equation [6]:

$$2n\pi/\delta<V1-V2<(2n+1)\pi/\delta. \quad [6]$$

On the other hand, in the case where the maximum frequency of the alternating current signal S1 is lower than that of the alternating current signal S2, similarly, the direct current biases V1 and V2 are set so that the phase changes θ1 and θ2 satisfy the following equation [2]:

$$(2n-1)\pi<\theta1-\theta2<2n\pi. \quad [2]$$

The following will describe effects given to deterioration of transmission quality by the setting of the direct current biases V1 and V2 in the case of transmitting the optical signal T2 outputted from the optical modulator 1 of the first embodiment through an optical transmission line having a dispersion characteristic.

A frequency response characteristic P(f) in the case of transmitting the optical signal T2 outputted from the optical modulator 1 of the first embodiment using an optical transmission line having a dispersion characteristic is represented by the following equations [7] and [8]. It is noted that f denotes a frequency, L denotes an optical transmission distance, D denotes a wavelength dispersion, c denotes a wavelength of the optical signal, and c denotes a velocity of light.

$$p(f) = \cos^2\left\{\frac{\pi L D \lambda c^2 f^2}{c\left(1-\frac{2}{\pi}\arctan(\alpha)\right)}\right\} \quad [7]$$

$$\alpha = -\cot\left(\frac{\theta_1-\theta_2}{2}\right)\cdot\left(\frac{\theta_1+\theta_2}{\theta_1-\theta_2}\right) \quad [8]$$

Figure 2:
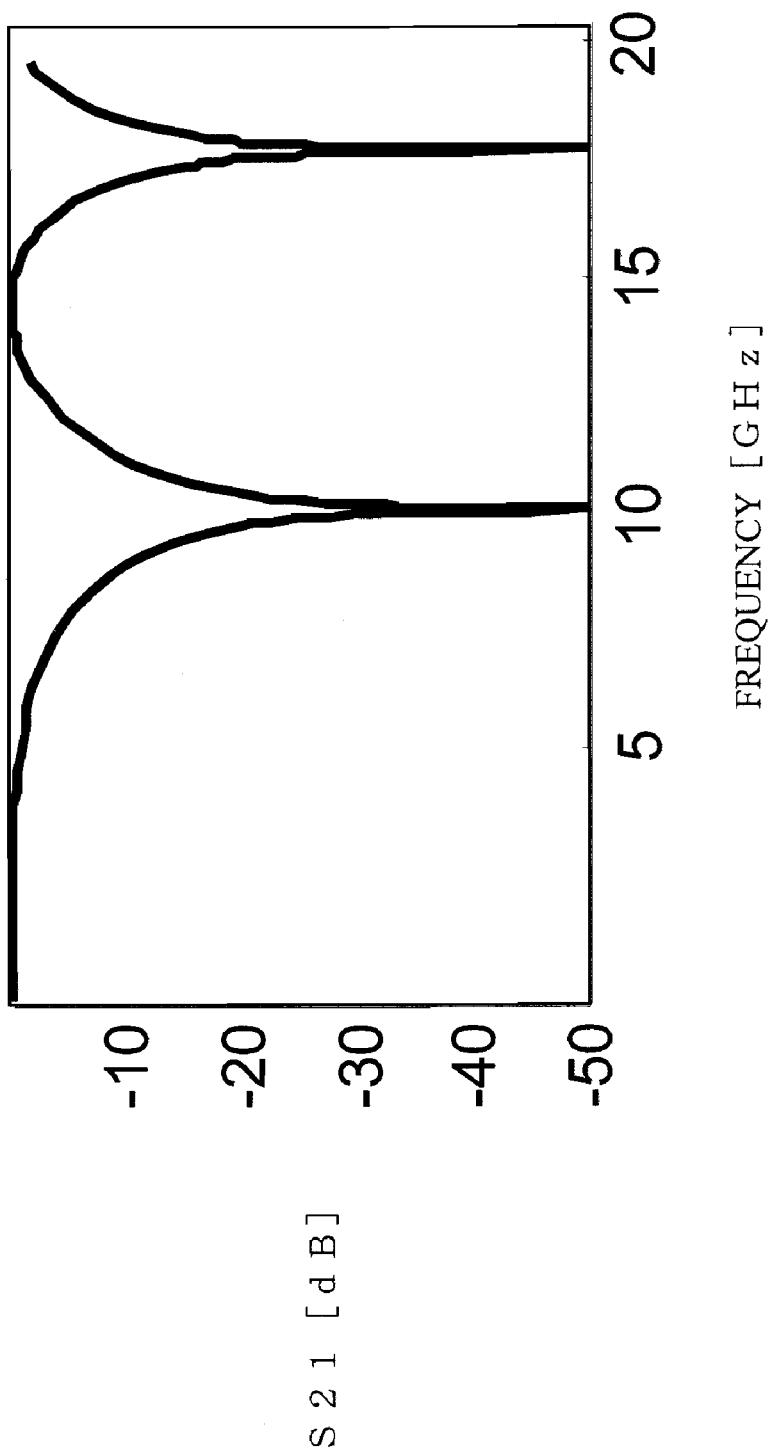
FIGS. 2 and 3 are graphs for explaining frequency response characteristics of the optical modulator 1 according to the first embodiment of the present invention.
Figure 3:
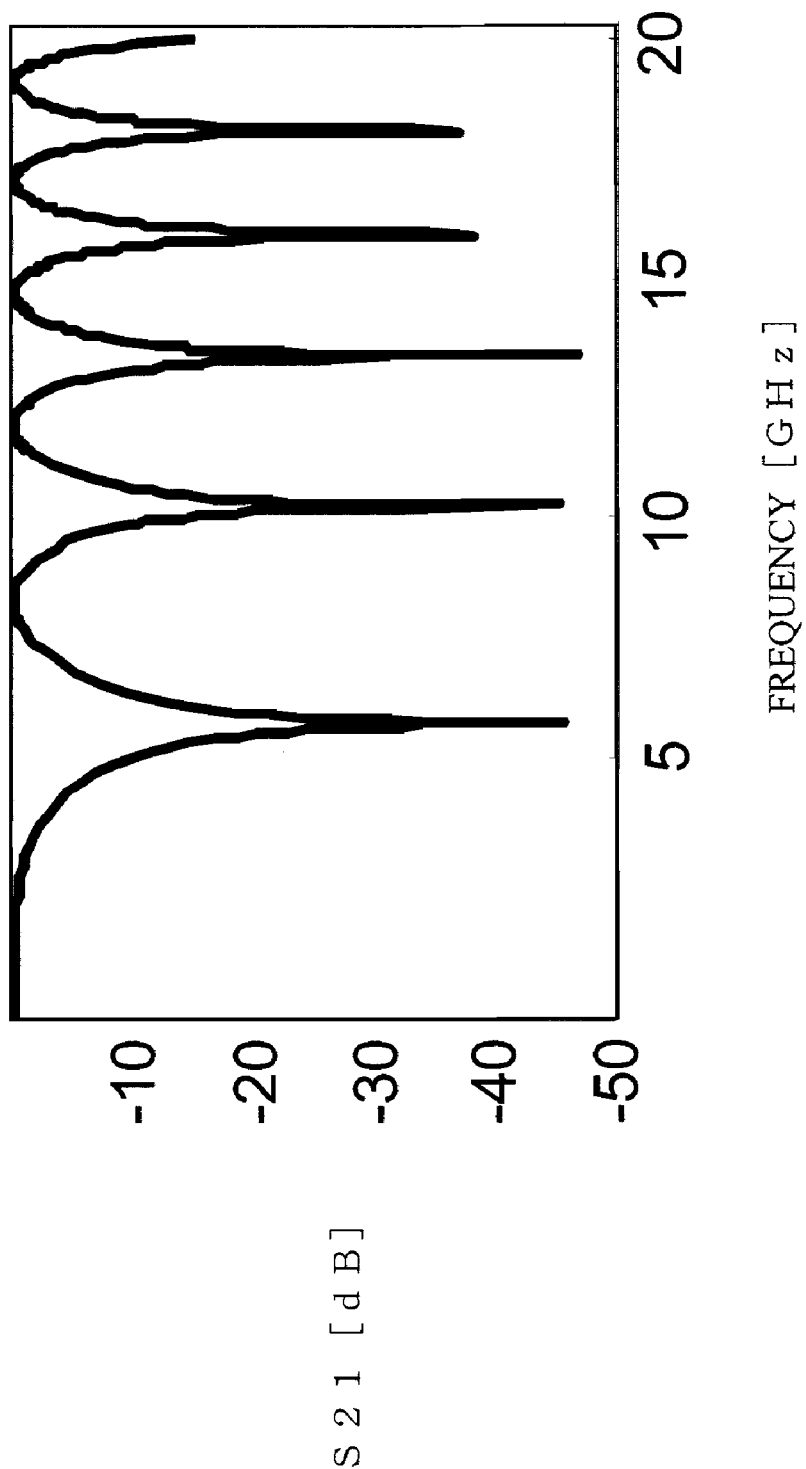

FIGS. 2 and 3 are graphs showing frequency response characteristics which are calculated from the equations [7] and [8] with L=50 km, D=17 ps/nm/km, and λc=1550 nm, in the case where the alternating current signal is applied to the electrode 21 or 22. Assuming that the optical transmission line has a positive dispersion characteristic, the wavelength dispersion D is set at a positive value.

In the case where the direct current biases V1 and V2 are set so as to satisfy the condition of the above equation [1], the electrode 21 indicates a frequency response characteristic as shown in FIG. 2, and the electrode 22 indicates a frequency response characteristic as shown in FIG. 3. As seen from FIGS. 2 and 3, a minimum frequency (a null point) to which a frequency response falls at the electrode 21 is 10.5 GHz, and a null point at the electrode 22 is around 6 GHz. Thus, in the case of the condition of the equation [1], the frequency response characteristic at the electrode 21 is excellent over a higher frequency in comparison to the frequency response characteristic at the electrode 22. In other words, deterioration of transmission quality can be reduced by applying to the electrode 21 the alternating current signal having the higher maximum frequency.

On the other hand, in the case where the direct current biases V1 and V2 are set so as to satisfy the condition of the above equation [2], the electrode 21 indicates a frequency response characteristic as shown in FIG. 3, and the electrode 22 indicates a frequency response characteristic as shown in FIG. 2. Thus, in the case of the condition of the equation [2], the frequency response characteristic at the electrode 22 is excellent over a higher frequency in comparison to the frequency response characteristic at the electrode 21. In other words, deterioration of transmission quality can be reduced by applying to the electrode 21 the alternating current signal having the lower maximum frequency.

As described above, in the case where the frequencies of the alternating current signals S1 and S2 which are applied to the electrodes 21 and 22, respectively, are known in advance (the signal frequency information D1), the direct current biases V1 and V2 are set so as to satisfy the above conditions, thereby reducing determination of transmission quality in the case of performing transmission using an optical transmission line having a positive dispersion characteristic throughout the entire transmission line.

The following will describe a specific example of a method of determining the direct current biases V1 and V2.

Generally, in the case of driving a Mach-Zehnder type optical modulator using an electro-optical effect with an alternating current signal, the direct current biases V1 and V2 are set so that even-order distortion becomes minimum.

At this time, a phase difference $\theta1-\theta2$ between the optical signal modulated by the optical waveguide 12 and the optical signal modulated by the optical waveguide 13 satisfies a relation of $\pi/2\times(2n+1)$. Also, since a power supply voltage is low in an actual circuit, it is preferable that an electric potential difference V1−V2 between the direct current bias V1 and the direct current bias V2 is set at a voltage $V(\pi/2)$ which causes the phase difference E1-E2 to become $\pi/2$, or a voltage $V(-\pi/2)$ which causes the phase difference $\theta1-\theta2$ to become $-\pi/2$.

Generally, when a direction of the optical axis of an electro-optic crystal corresponds to a direction of an applied electric field, a maximum change of refractive index is obtained, and a negative change of refractive index is obtained by applying a positive electric field. Therefore, a phase of an optical signal outputted from an optical waveguide to which a positive electric field is applied in the direction of the optical axis proceeds in comparison to an optical signal outputted from an optical waveguide to which an electric field is not applied. For example, in the case where an electrode is arranged so that the direction of the optical direction of the crystal corresponds to the direction of the applied electric field, a voltage $V(\pi)$ which causes the phase difference $\theta1-\theta2$ to become n is 5.0V and a DC drift is 0V, the voltage $V(\pi/2)$ is 2.5V and the voltage $V(-\pi/2)$ is −2.5V.

According to the above, the phase difference $\theta1-\theta2$ satisfies the equation [1] when the electric potential difference V1−V2 is set at the voltage $V(\pi/2)$, and the phase difference $\theta1-\theta2$ satisfies the equation [2] when the electric potential difference V1−V2 is set at the voltage $V(-\pi/2)$. Therefore, in the case where the frequency of the alternating current signal S1 inputted to the electrode 21 is higher than that of the alternating current signal S2 inputted to the electrode 22, the phase difference V1−V2 is set at the voltage $V(\pi/2)$. On the other hand, in the case where the frequency of the alternating current signal S1 inputted to the electrode 21 is lower than that of the alternating current signal S2 inputted to the electrode 22, the phase difference V1−V2 is set at the voltage $V(-\pi/2)$.

As described above, according to the optical modulator 1 of the first embodiment of the present invention, by giving the signal frequency information D1 of the inputted alternating current signals S1 and S2 to the bias setting section 41, it is possible to multiplex the alternating current signals S1 and S2 having the different frequencies using appropriate bias values which minimize deterioration of transmission in long-distance transmission.

The above first embodiment has described the case of using a Z-cut type electro-optic crystal in FIG. 1. Also, in the case of using an X-cut type electro-optic crystal, the same advantageous effects as described above can be obtained by appropriately arranging the electrodes.

Figure 4:
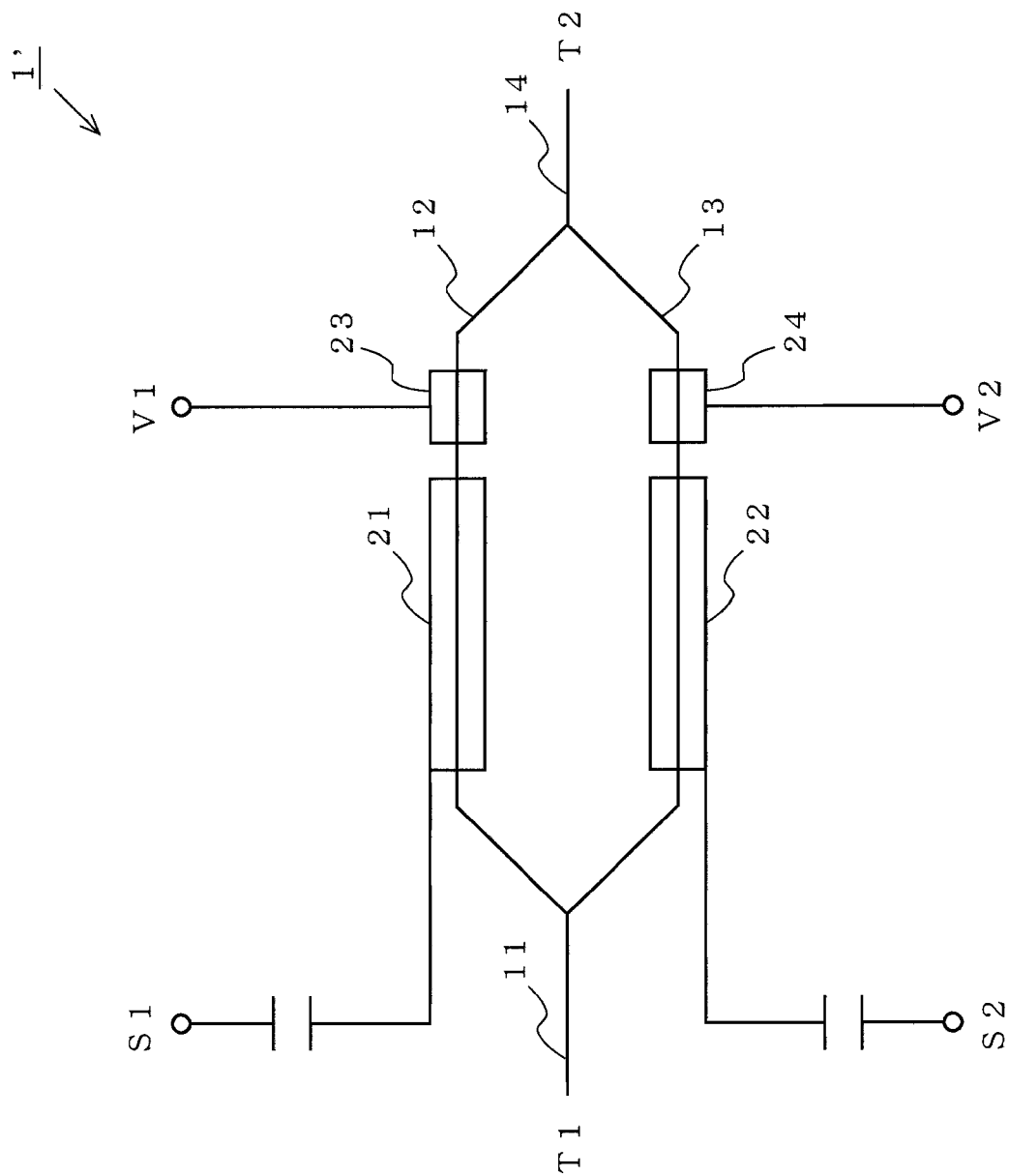
FIG. 4 illustrates a configuration of another optical modulator 1' according to the first embodiment of the present invention.

The above first embodiment has described the case of superimposing the direct current bias by the bias tee. Alternatively, electrodes 23 and 24 dedicated for direct current biases are used as shown in FIG. 4 for adding the direct current biases thereto. Even in this case, the same advantageous effects as described above can be obtained.

The above first embodiment has described the case where the optical signal outputted from the optical waveguide 14 is inputted to the optical transmission line having the positive dispersion characteristic throughout the entire transmission line. Alternatively, the first embodiment is applicable to the case where the optical signal outputted from the optical waveguide 14 is inputted to an optical transmission line having a negative dispersion characteristic throughout the entire transmission line. It is noted that in this case, the bias setting section 41 may set the direct current biases V1 and V2 so as to satisfy the equation [2] when the maximum frequency of the alternating current signal S1 is higher than that of the alternating current signal S2, and may set the direct current biases V1 and V2 so as to satisfy the equation [1] when the maximum frequency of the alternating current signal S1 is lower than that of the alternating current signal S2.

Second Embodiment

The above first embodiment has describes the configuration of the optical modulator 1 in the case where the frequencies of the alternating current signals S1 and S2 are known in advance.

The following second embodiment will describe a configuration of an optical modulator 2 in the case where the frequencies of the alternating current signals S1 and S2 are not known in advance.

Figure 5:
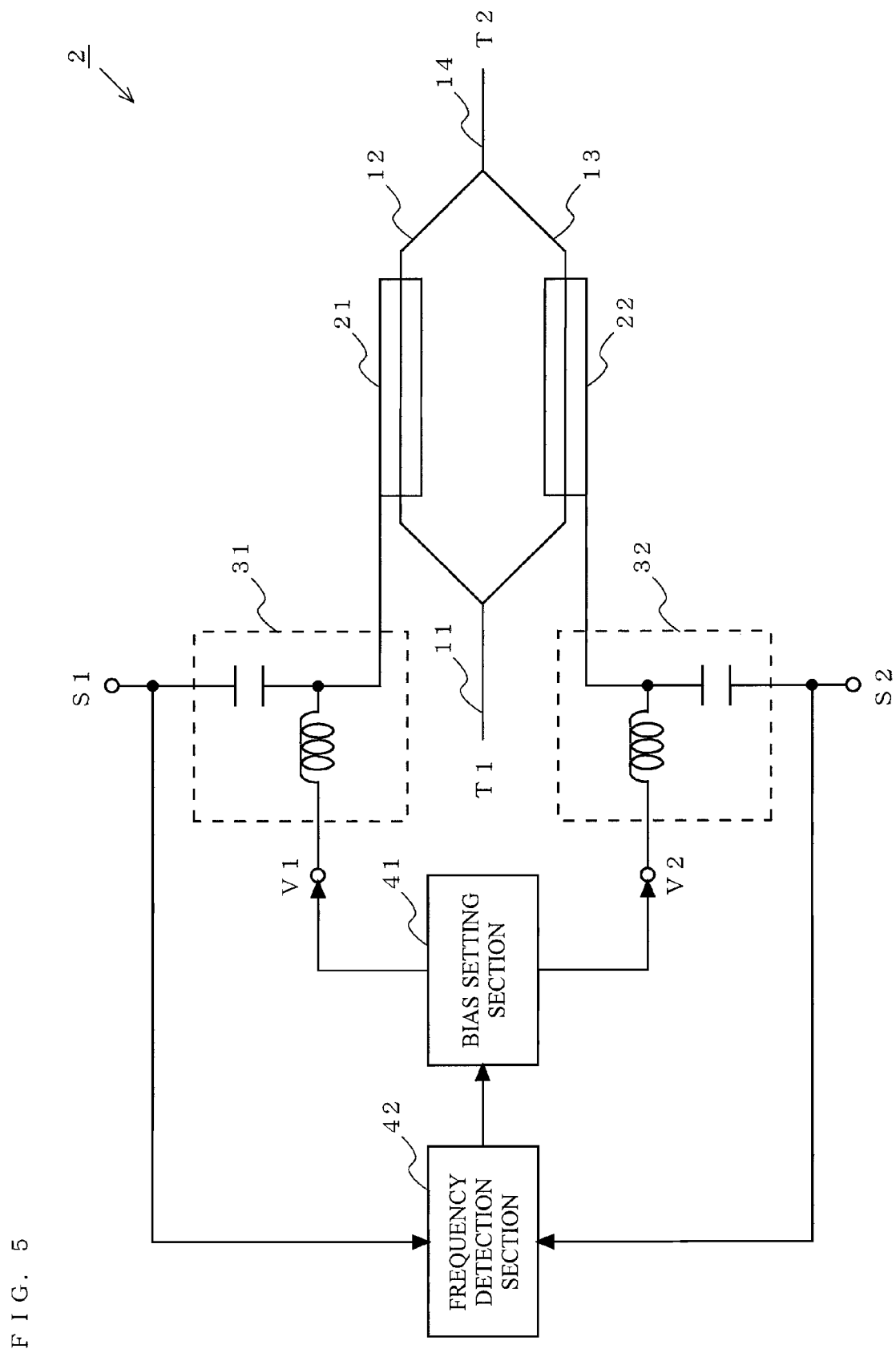
FIG. 5 illustrates a configuration of an optical modulator 2 according to a second embodiment of the present invention.

FIG. 5 illustrates a configuration of the optical modulator 2 according to the second embodiment of the present invention. The optical modulator 2 according to the second embodiment comprises optical waveguides 11 to 14, electrodes 21 and 22, bias tees 31 and 32, a bias setting section 41, and a frequency detection section 42. The optical modulator 2 is different from the optical modulator 1 in configuration in that the frequency detection section 42 is provided further. The following will describe the optical modulator 2, mainly the frequency detection section 42. For the other configuration, the same reference numerals are used, and the description thereof will be omitted.

The frequency detection section 42 detects frequencies of the alternating current signals S1 and S2, generates signal frequency information D1 including the detected frequencies, and gives the signal frequency information D1 to the bias setting section 41. The bias setting section 41 outputs appropriate direct current biases V1 and V2 based on the signal frequency information D1 given from the frequency detection section 42. It is noted that a method of setting the direct current biases V1 and V2 by the bias setting section 41 is as described in the first embodiment.

As described above, according to the optical modulator 2 of the second embodiment of the present invention, even in the case where the alternating current signals S1 and S2 are not known in advance, it is possible to multiplex the alternating current signals S1 and S2 having the different frequencies using the appropriate bias values which minimize deterioration of transmission in long-distance transmission.

Third Embodiment

The first and second embodiments have described the configurations of the optical modulators 1 and 2 each of which appropriately sets the direct current biases V1 and V2 given to the electrodes 21 and 22.

The following third embodiment will describe a configuration of an optical modulator 3 which appropriately switches between the alternating current signals S1 and S2 inputted to the electrodes 21 and 22

Figure 6:
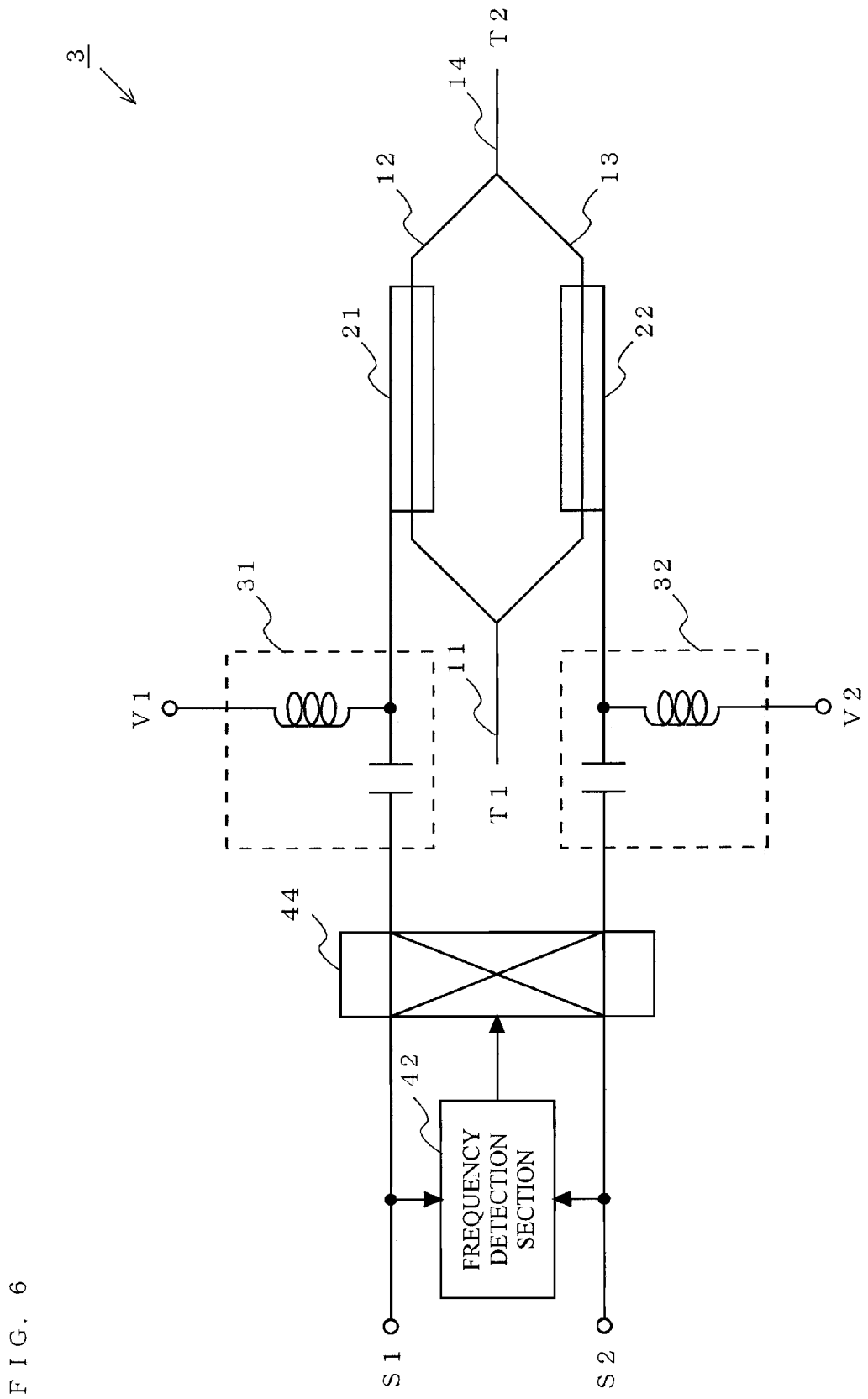
FIG. 6 illustrates a configuration of an optical modulator 3 according to a third embodiment of the present invention.

FIG. 6 illustrates a configuration of the optical modulator 3 according to the third embodiment of the present invention. The optical modulator 3 according to the third embodiment comprises optical waveguides 11 to 14, electrode 21 and 22, bias tees 31 and 32, a frequency detection section 42, and a signal switch section 44. The optical modulator 3 is different from the optical modulator 2 in configuration in that the signal switch section 44 is provided instead of the bias setting section 41. The following will describe the optical modulator 3, mainly the signal switch section 44. For the other configuration, the same reference numerals are used, and the description thereof will be omitted.

The direct current biases V1 and V2 are set in advance at specific values so as to satisfy the conditions of the above equations [1] and [2]. The frequency detection section 42 detects frequencies of the alternating current signals S1 and S2, generates signal frequency information D1 including the detected frequencies, and gives the signal frequency information D1 to the signal switch section 44. The signal switch section 44 inputs the alternating current signals S1 and S2, switches elements to which the alternating current signals S1 and S2 are outputted based on the signal frequency information D1 given from the frequency detection section 42. In other words, the signal switch section 44 selects a path in which the alternating current signal S1 is outputted to the electrode 21 and the alternating current signal S2 is outputted to the electrode 22, or a path in which the alternating current signal S1 is outputted to the electrode 22 and the alternating current signal S2 is outputted to the electrode 21.

In the case where the direct current biases V1 and V2 are set so as to satisfy the condition of the equation [1], the signal switch section 44 selects a path in which an alternating current signal having a higher frequency is outputted to the electrode 21 and an alternating current signal having a lower frequency is outputted to the electrode 22. On the other hand, in the case where the direct current biases V1 and V2 are set so as to satisfy the condition of the equation [2], the signal switch section 44 selects a path in which an alternating current signal having a higher frequency is outputted to the electrode 22 and an alternating current signal having a lower frequency is outputted to the electrode 21.

As described above, according to the optical modulator 3 of the third embodiment of the present invention, even in the case where the alternating current signals S1 and S2 are not known in advance, it is possible to multiplex the alternating current signals S1 and S2 having the different frequencies using the appropriate bias values which minimize deterioration of transmission in long-distance transmission. Also, even in the case where the alternating current signals S1 and S2 temporally change and the maximum frequencies of the alternating current signals S1 and S2 change, it is possible to follow this change automatically.

Also, the above third embodiment has described the case where the optical signal outputted from the optical waveguide 14 is inputted to the optical transmission line having the positive dispersion characteristic throughout the entire transmission line. Alternatively, the third embodiment is applicable to the case where the optical signal outputted from the optical waveguide 14 is inputted to an optical transmission line having a negative dispersion characteristic throughout the entire transmission line. It is noted that in this case, in the case where the direct current biases V1 and V2 are set so as to satisfy the condition of the equation [1], the signal switch section 44 selects a path in which an alternating current signal having a lower frequency is outputted to the electrode 21 and an alternating current signal having a higher frequency is outputted to the electrode 22. On the other hand, in the case where the direct current biases V1 and V2 are set so as to satisfy the condition of the equation [2], the signal switch section 44 selects a path in which an alternating current signal having a lower frequency is outputted to the electrode 22 and an alternating current signal having a higher frequency is outputted to the electrode 21.

Fourth Embodiment

The first to third embodiments have described the methods in which the electrodes to which the direct current biases or the alternating current signals are inputted are appropriately set based on the maximum frequency of the alternating current signal S1 and the maximum frequency of the alternating current signal S2 to select a transmission path having a frequency response which is appropriate for frequency characteristics of the input signals, thereby suppressing deterioration of transmission in transmission.

The following fourth embodiment will describe a method of setting a frequency response characteristic with respect to the alternating current signal S1 and a frequency response characteristic with respect to the alternating current signal S2 at desired characteristics.

Figure 7:
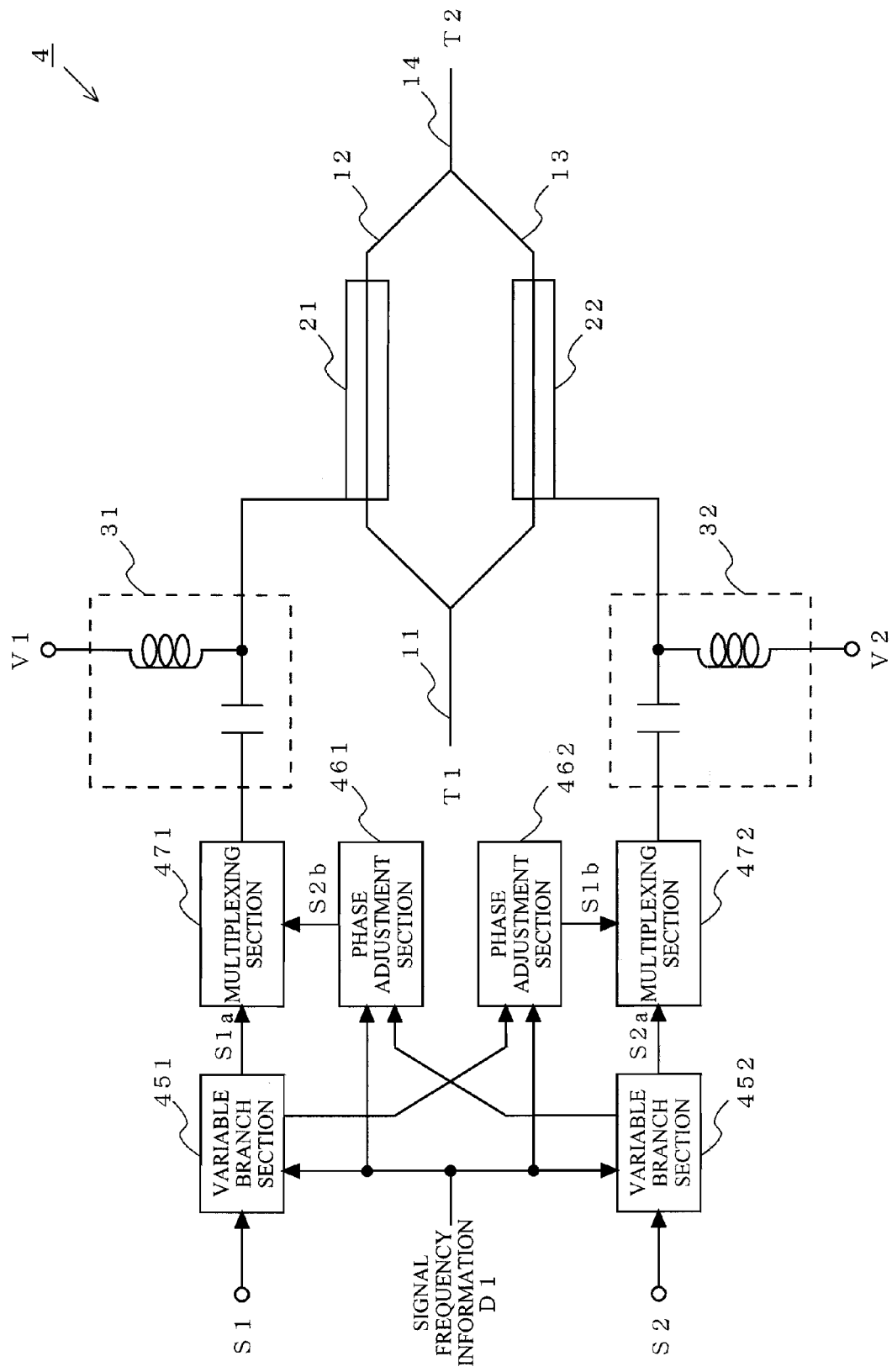
FIG. 7 illustrates a configuration of an optical modulator 4 according to a fourth embodiment of the present invention.

FIG. 7 illustrates a configuration of an optical modulator 4 according to the fourth embodiment of the present invention. The optical modulator according to the fourth embodiment comprises optical waveguides 11 to 14, electrodes 21 and 22, bias tees 31 and 32, variable branch sections 451 and 452, phase adjustment sections 461 and 462, and multiplexing sections 471 and 472. The optical modulator 4 is different from the optical modulator 3 in configuration in that the variable branch sections 451 and 452, the phase adjustment sections 461 and 462, and the multiplexing sections 471 and 472 are provided instead of the signal switch section 44. The following will describe the optical modulator 4, mainly the variable branch sections 451 and 452, the phase adjustment sections 461 and 462, and the multiplexing sections 471 and 472. For the other configuration, the same reference numerals are used, and the description thereof will be omitted.

The variable branch section 451 branches the alternating current signal S1 with a desired branch ratio (A:B) based on the signal frequency information D1, and outputs a main signal S1a (=S1×A/B) and a branch signal S1b (=S1×B/A). The variable branch section 452 branches the alternating current signal S2 with the desired branch ratio based on the signal frequency information D1, and outputs a main signal S1a (=S2×A/B) and a branch signal S1b (=S2×B/A).

The desired branch ratio is a ratio which causes the frequency response characteristic with respect to the alternating current signal S1 and the frequency response characteristic with respect to the alternating current signal S2 to become desired characteristics, and set more specifically as follows. Where P1max and P1min denote a power of a maximum frequency component and a power of a minimum frequency component of the alternating current signal S1, respectively, and P2max and P2min denote a power of a maximum frequency component and a power of a minimum frequency component of the alternating current signal S2, respectively, the branch ratio is set at a value which satisfies the following equations [9] and [10]:

$$P1\text{max}/P1\text{min} > 1/2 \quad [9]$$

$$P2\text{max}/P2\text{min} > 1/2. \quad [10]$$

The phase adjustment section 461 adjusts a phase of the branch signal S2b outputted from the variable branch section 452 based on the signal frequency information D1, and outputs the adjusted branch signal S2b to the multiplexing section 471. The phase adjustment section 462 adjusts a phase of the branch signal S1b outputted from the variable branch section 451 based on the signal frequency information D1, and outputted the adjusted branch signal S1b to the multiplexing section 472.

The multiplexing section 471 combines the main signal S1a outputted from the variable branch section 451 and the branch signal S2b outputted from the phase adjustment section 461, and outputs a combined signal to the bias tee 31. The multiplexing section 472 combines the main signal S2a outputted from the variable branch section 452 and the branch signal S1b outputted from the phase adjustment section 462, and outputs a combined signal to the bias tee 32.

By this multiplexing processing, the optical modulator 4 according to the fourth embodiment becomes capable of adjusting a frequency response to desired characteristics.

The following will described the detail of the adjustment based on the frequency response characteristic with respect to each of the alternating current signals S1 and S2 which are calculated from the equations [7] and [8] in the case where an output signal of the optical modulator 4 is transmitted using a transmission path having a positive dispersion characteristic throughout the entire transmission path. Here, frequency response characteristics in the case where a transmitted optical signal is transmitted for 50 km and received are calculated. It is noted that the direct current biases V1 and V2 are set as V1=V2=V(π/2). V(π/2) denotes an electric potential difference between the electrode 21 and the electrode 22 which causes a phase difference between the optical signal modulated by the optical waveguide 12 and the optical signal modulated by the optical waveguide 13 to become π/2.

Figure 8:
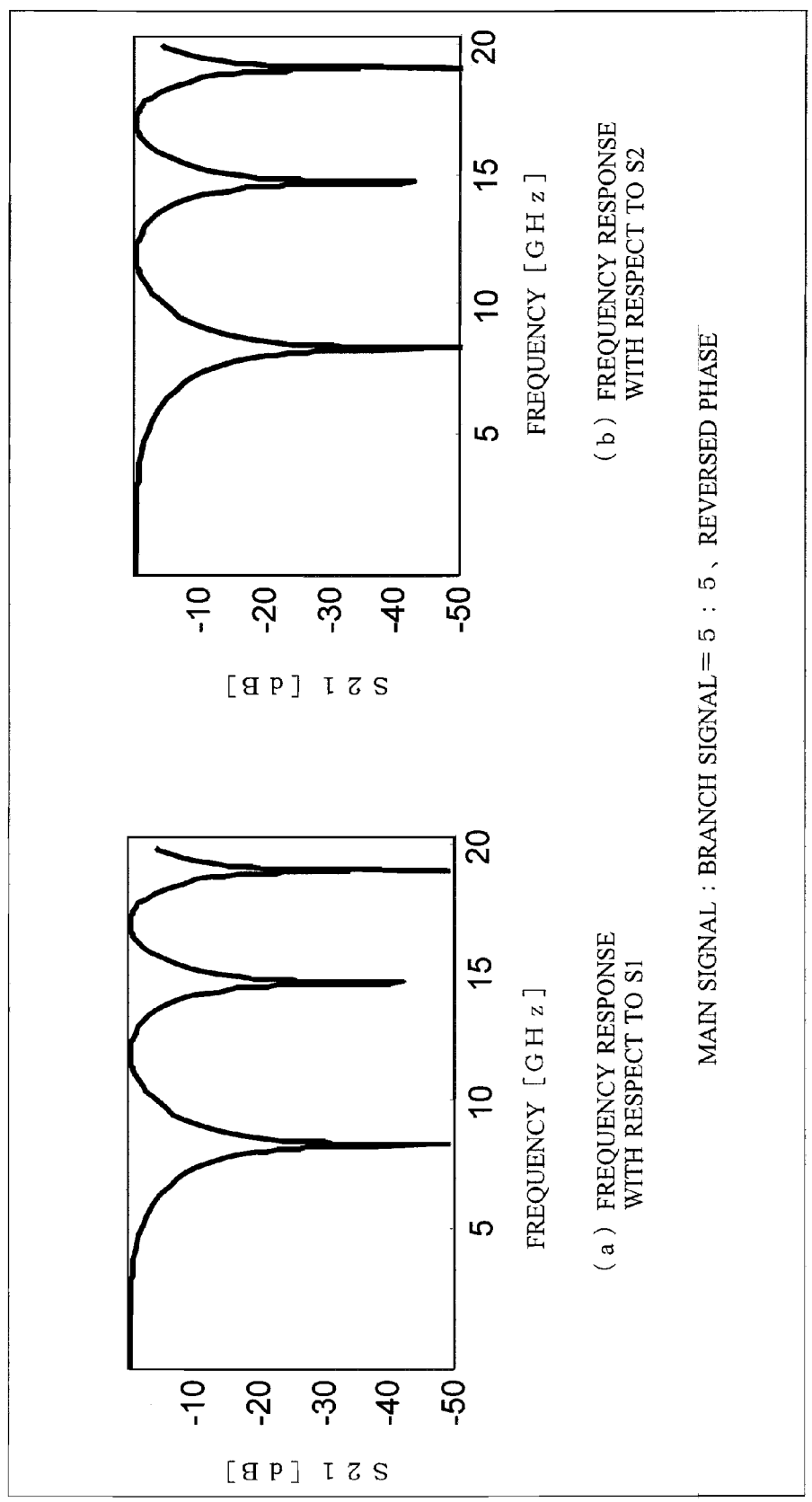
FIGS. 8 to 12 are graphs for explaining frequency response characteristics of the optical modulator 4 according to the fourth embodiment of the present invention.
Figure 9:
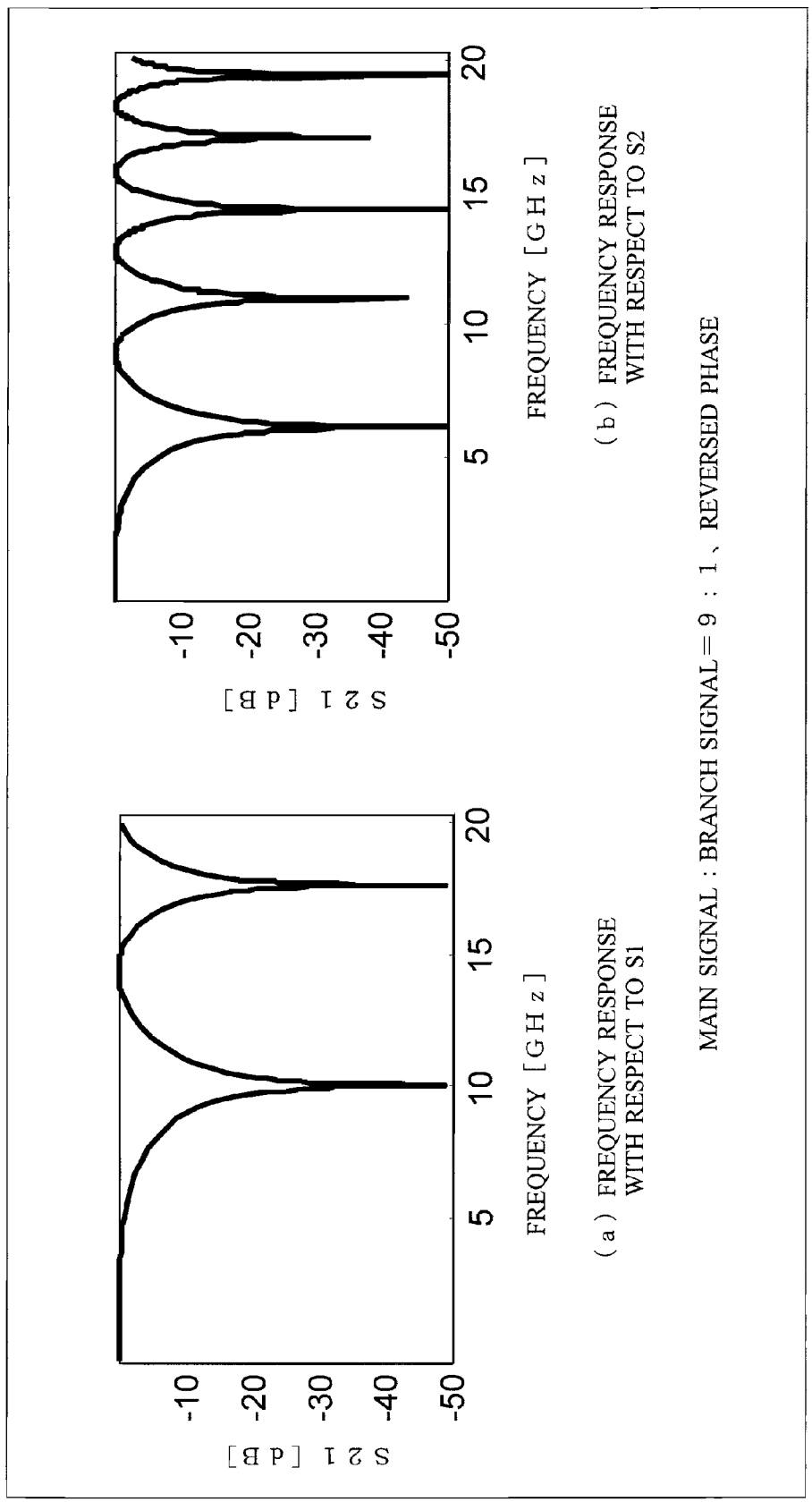
Figure 10:
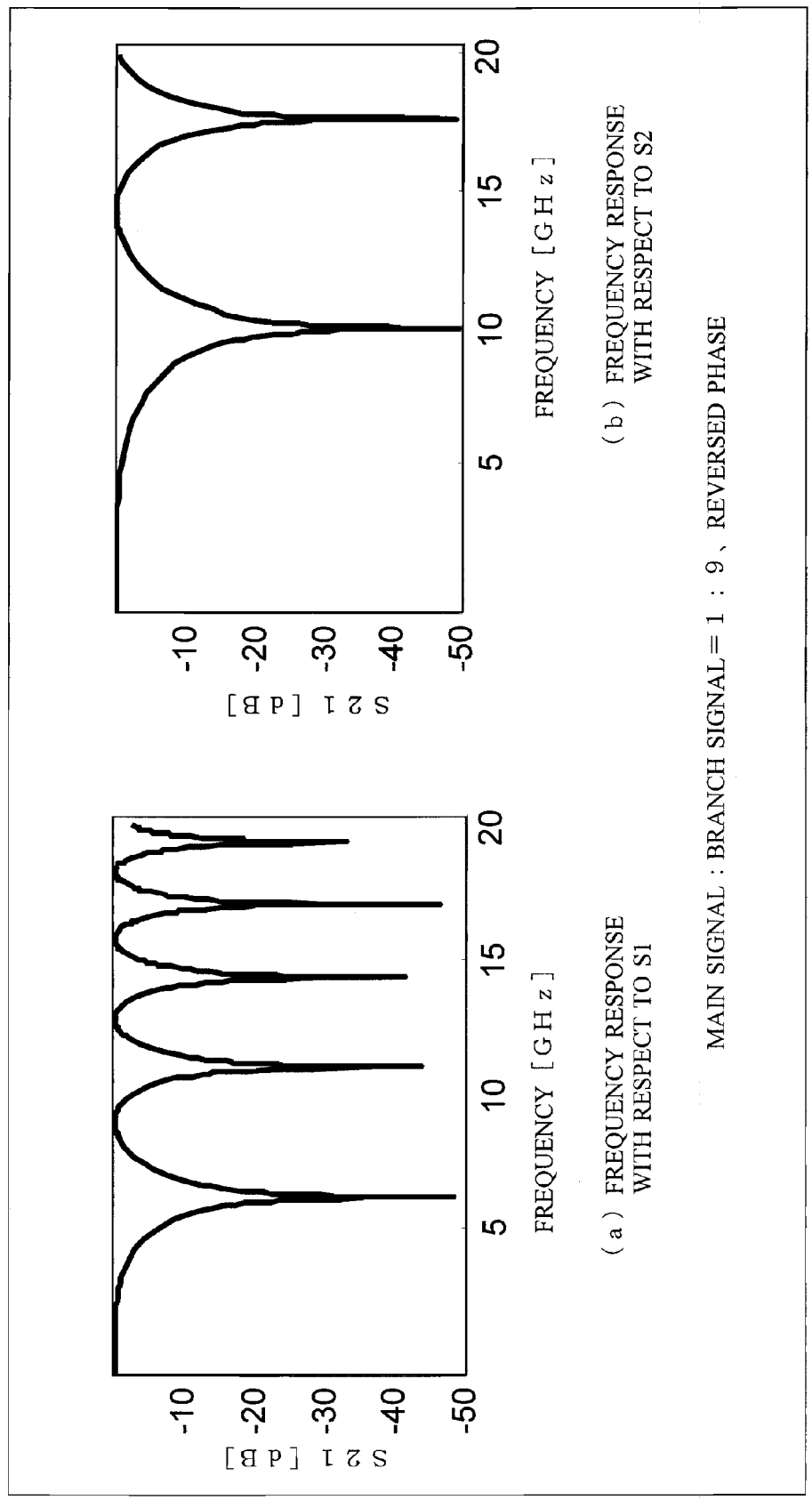

FIGS. 8 to 10 are graphs each showing frequency response characteristics when a main signal (S1a or S2a) and a branch signal (S1b or S2b) which are obtained by performing branching with a branch ratio 5:5, 9:1, or 1:9 are combined in the case where a phase of the branch signal is reverse to a phase of the main signal (the branch signal is inverted).

When a main signal and a branch signal obtained by performing branching with a branch ratio 5:5 are combined, a frequency response with respect to the alternating current signal S1 becomes the substantially same as that with respect to the alternating current signal S2 (both are 6 GHz in an example of FIG. 8). Thus, when the frequency of the alternating current signal S1 is substantially equal to that of the alternating current signal S2, maximum performance for both of the alternating current signal S1 and S2 can be obtained by making branch ratios for branching the alternating current signals S1 and S2 into a main signal and a branch signal equal to each other.

On the other hand, the frequency response with respect to the alternating current signal S1 and the frequency response with respect to the alternating current signal S2 can be different from each other by making branch ratios for branching the alternating current signals S1 and S2 into a main signal and a branch signal unequal to each other. For example, in the case of a branch ratio 9:1 as shown in FIG. 9, a 3 dB band with respect to the alternating current signal S1 is about 7 GHz while a 3 dB band with respect to the alternating current signal S2 is about 4.5 GHz. Also, in the case of a branch ratio 1:9 as shown in FIG. 10, the frequency response with respect to the alternating current signal S1 and the frequency response with respect to the alternating current signal S2 can be opposite to those in FIG. 9. In other words, the frequency response with respect to the alternating current signal S2 can be higher than that with respect to the alternating current signal S1.

Figure 11:
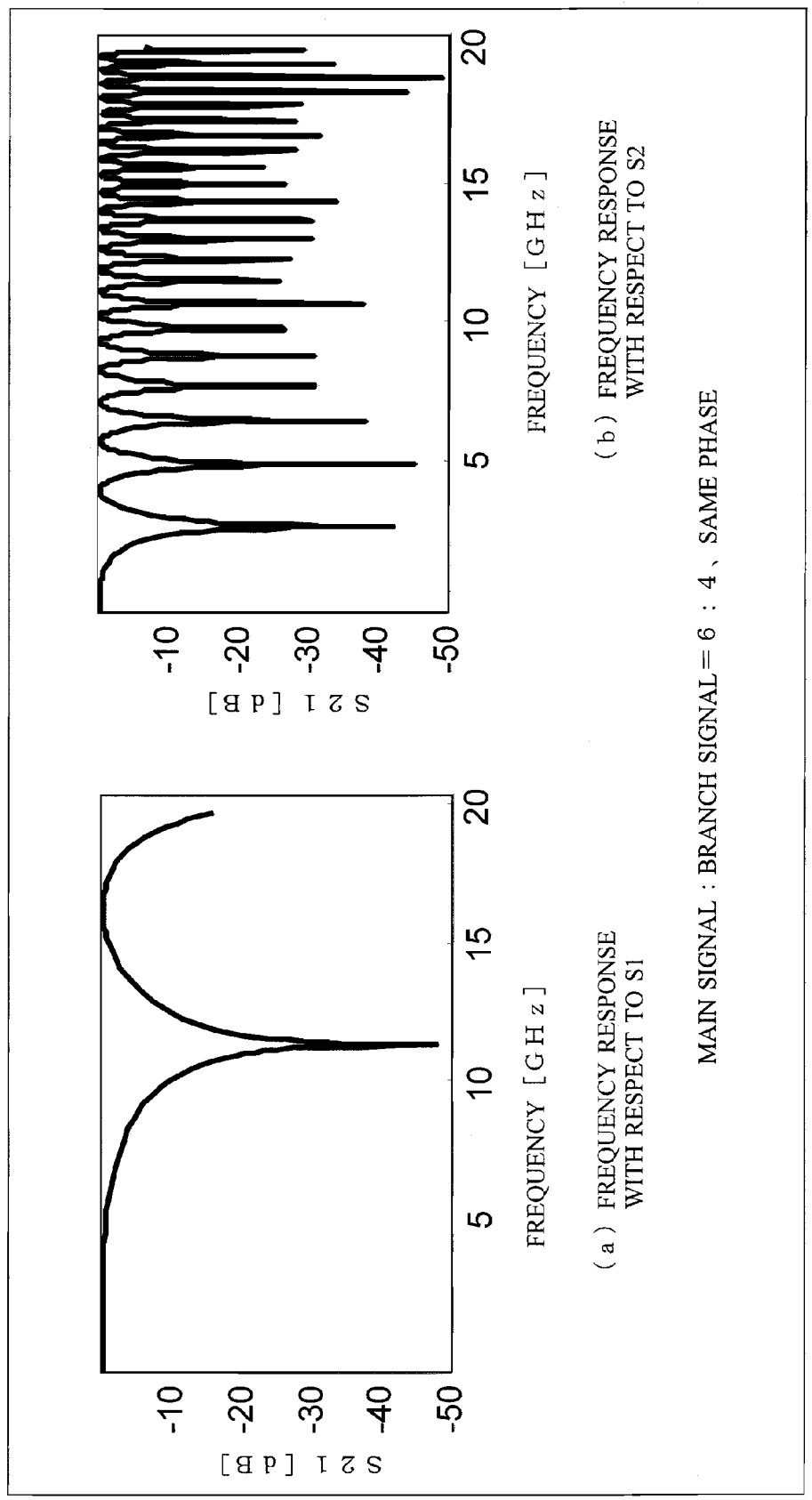
Figure 12:
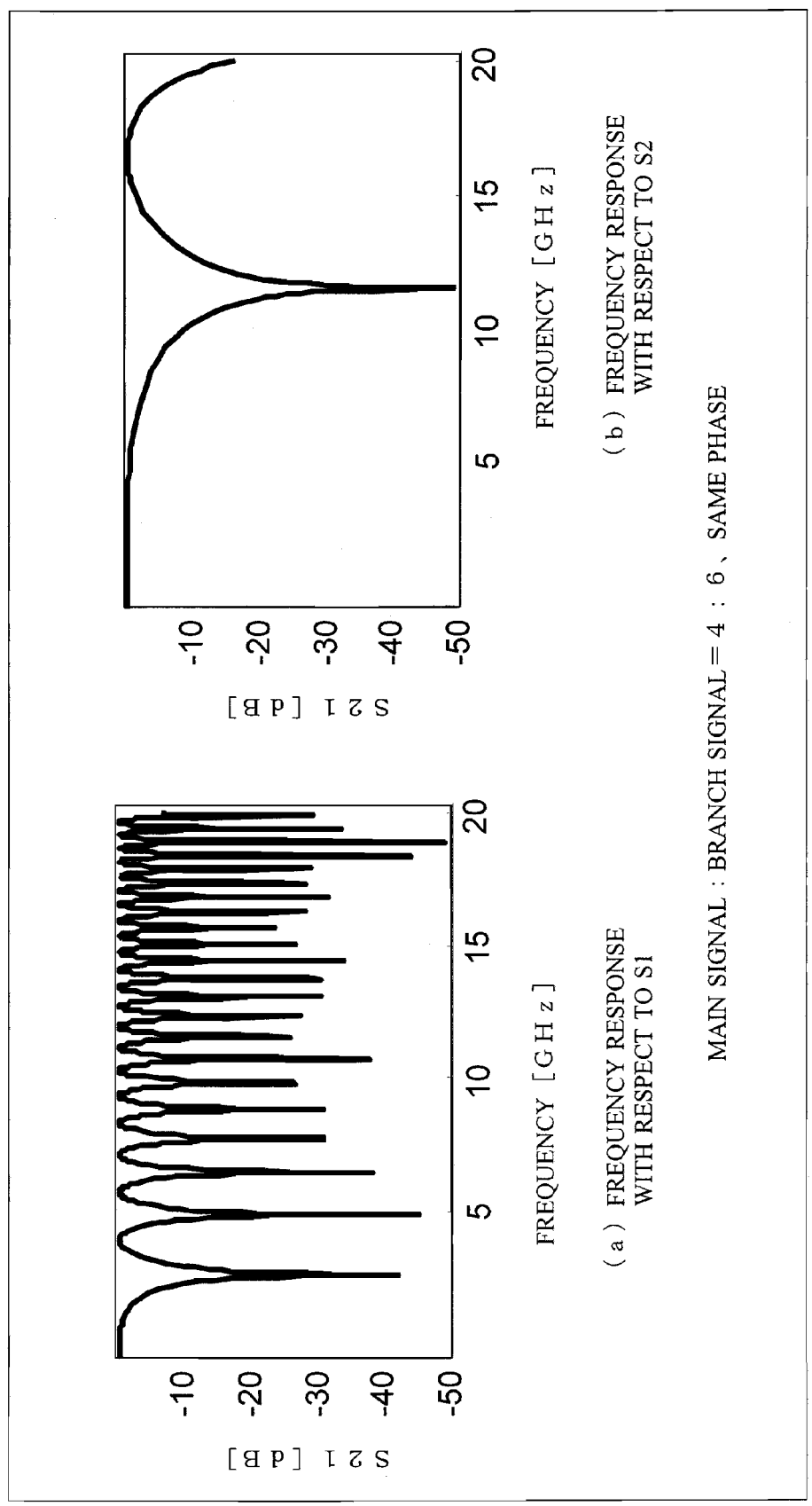

FIGS. 11 and 12 are graphs each showing frequency response characteristics when a main signal (S1a or S2a) and a branch signal (S1b or S2b) which are obtained by performing branching with a branch ratio 6:4 or 4:6 are combined in the case where phases of the main signal and the branch signal is the same. As seen from FIGS. 11 and 12, a detected signal level is smaller in the case where the phases of the main signal and the branch signal are the same than in the case where the phases of the main signal and the branch signal are reverse to each other, and the frequency response with respect to any of the alternating current signals S1 and S2 can be higher than in the case where the phases of the main signal and the branch signal are reverse to each other. Therefore, even in the case where the alternating current signal S1 or S2 has a high frequency and a reversed phase to the other and the alternating current signals S1 and S2 are combined with a changed combination ratio, it is effective when a frequency response is insufficient.

For example, in the case of conditions as shown in FIG. 11, a 3 dB band with respect to the alternating current signal S1 is about 7.5 GHz while a 3 dB band with respect to the alternating current signal S2 is about 2 GHz. Thus, this phase condition is effective when the frequency of the alternating current signal S1 is significantly different from that of the alternating current signal S2. Naturally, the frequency response with respect to the alternating current signal S1 and the frequency response with respect to the alternating current signal S2 can be reversed by making a level of the branch signal higher than that of the main signal.

As described above, according to the optical modulator 4 of the fourth embodiment of the present invention, the frequency responses with respect to the alternating current signals S1 and S2 can be appropriately set by changing the branch ratios for and the phases of the alternating current signals S1 and S2. Thus, performance of long-distance transmission of each alternating current signal can be ensured at a maximum.

Also, the above fourth embodiment has described the case where an optical signal outputted from the optical waveguide 14 is inputted to an optical transmission line having a positive dispersion characteristic throughout the entire transmission line. Alternatively, the fourth embodiment is applicable to the case where an optical signal outputted from the optical waveguide 14 is inputted to an optical transmission line having a negative dispersion characteristic throughout the entire transmission line. It is noted that in this case, the same advantageous effects can be obtained by using branch ratios of a main signal and a branch signal which are reversed from those in the case where the optical signal is inputted to the optical transmission line having the positive dispersion characteristic.

Fifth Embodiment

Figure 13:
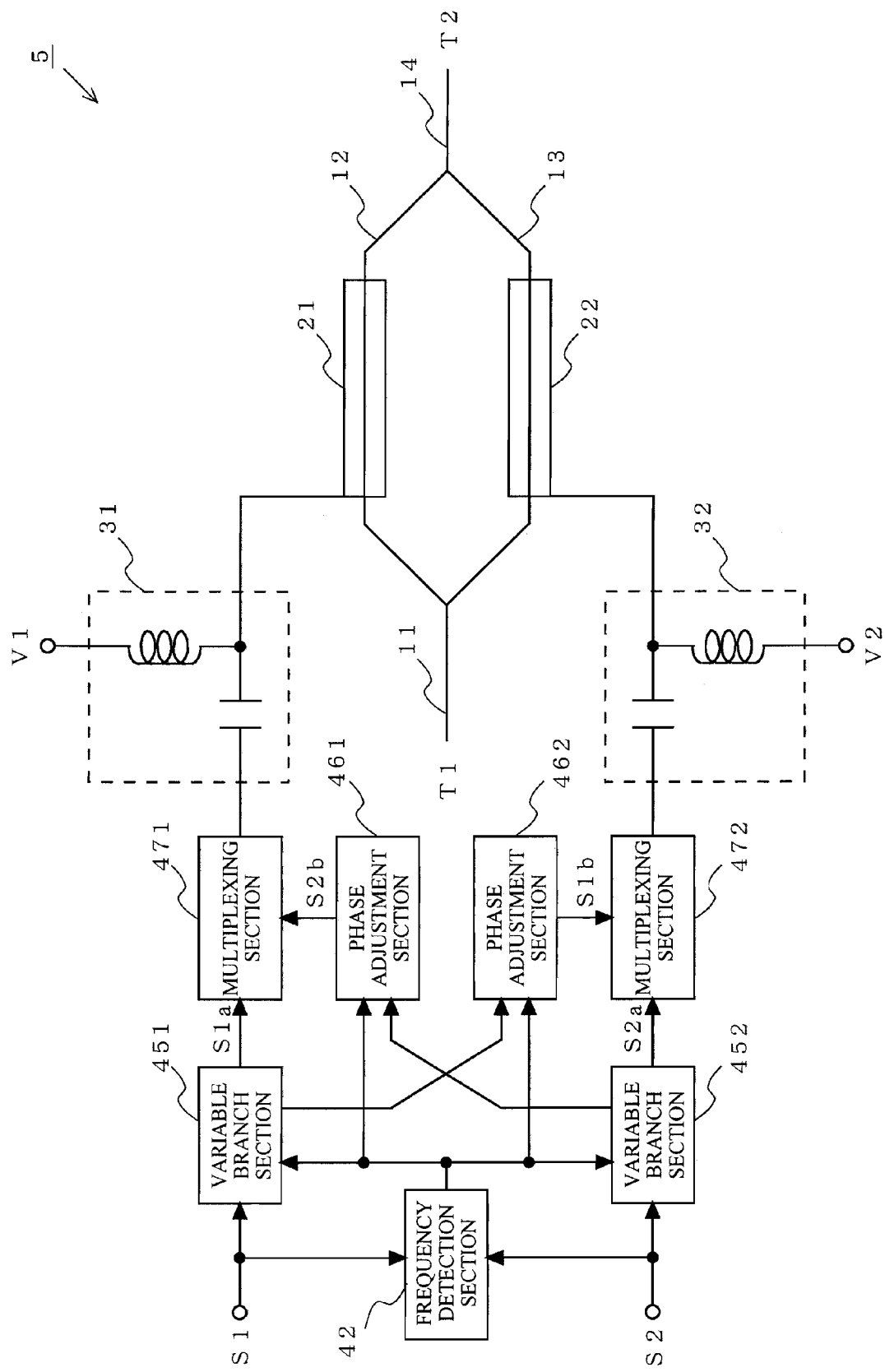
FIG. 13 illustrates a configuration of an optical modulator 5 according to a fifth embodiment of the present invention.
Figure 14:
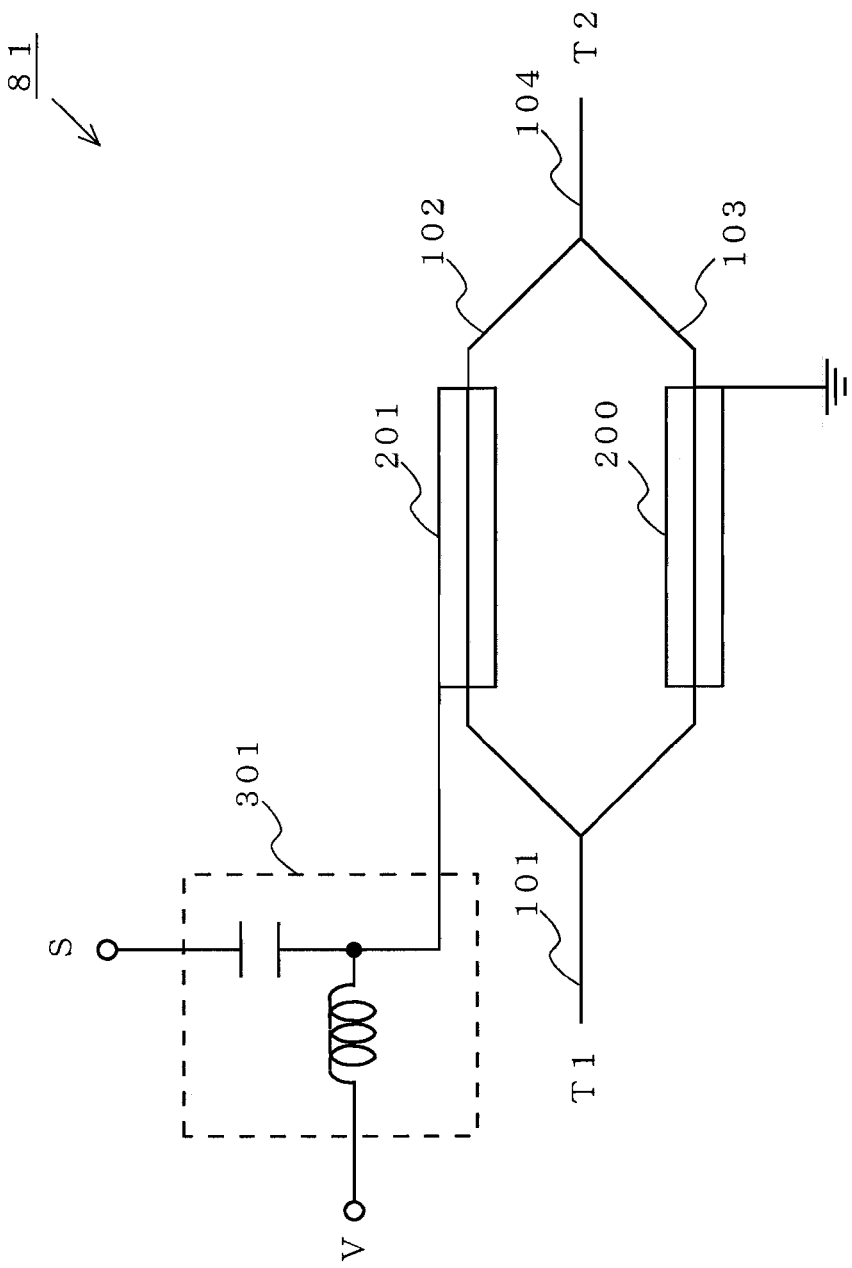
FIG. 14 illustrates a configuration of a conventional optical modulator 81.
Figure 15:
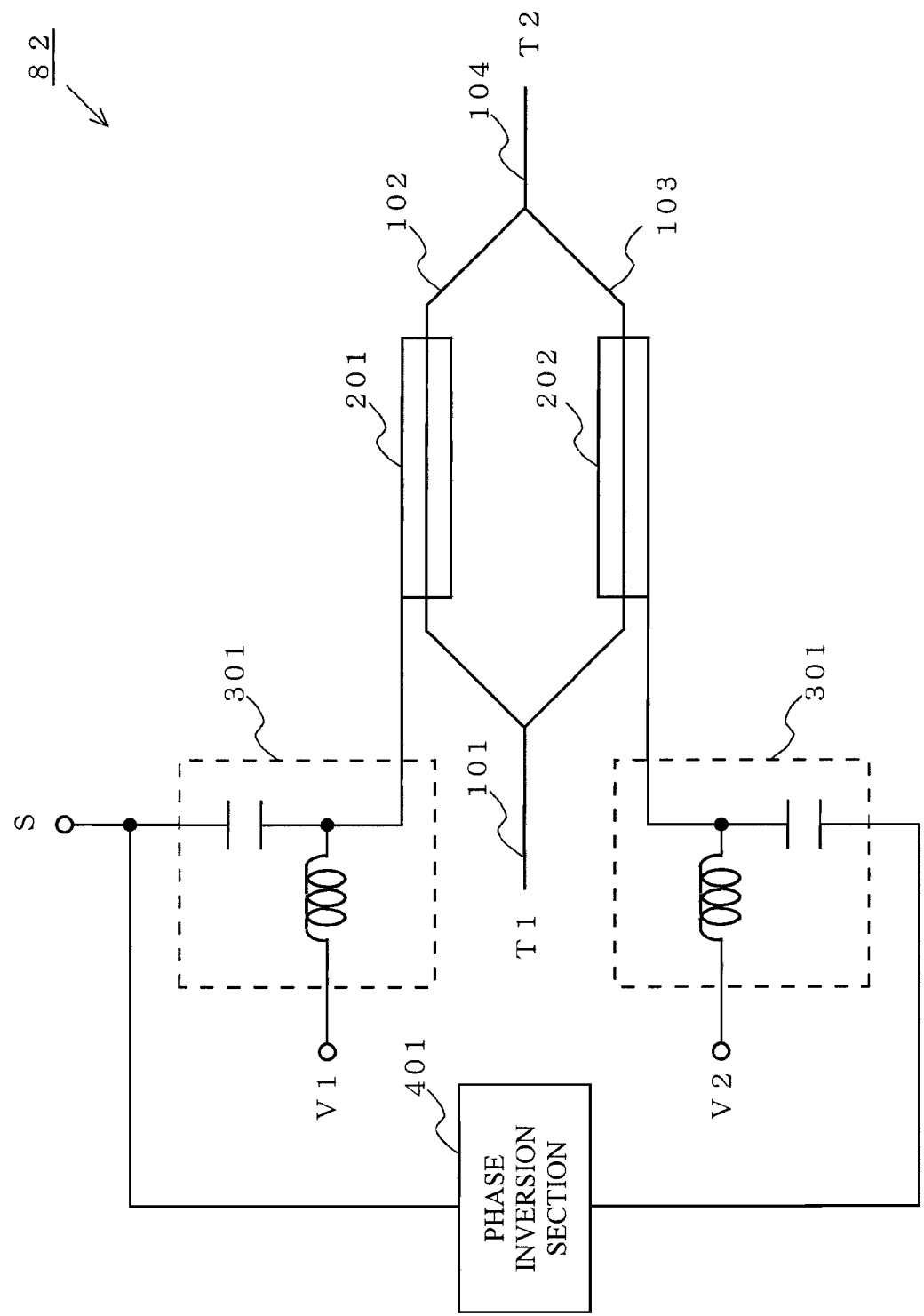
FIG. 15 illustrates a configuration of a conventional optical modulator 82.

FIG. 13 illustrates a configuration of an optical modulator 5 according to a fifth embodiment of the present invention The optical modulator 5 according to the fifth embodiment comprises optical waveguides 11 to 14, electrodes 21 and 22, bias tees 31 and 32, a frequency detection section 42, variable branch sections 451 and 452, phase adjustment sections 461 and 462, and multiplexing sections 471 and 472. The optical modulator 5 is different from the optical modulator 4 in configuration in that the frequency detection section 42 is provided further.

The frequency detection section 42 detects frequencies of the alternating current signals S1 and S2, and generates signal frequency information D1 including the detected frequencies similarly as described in the second embodiment. The generated signal frequency information D1 is given to the variable branch sections 451 and 452 and the phase adjustment sections 461 and 462.

As described above, according to the optical modulator 5 of the fifth embodiment of the present invention, even in the case where the frequencies of the alternating current signals S1 and S2, the frequency responses with respect to the alternating current signals S1 and S2 can be appropriately set by changing the branch ratios for and the phases of the alternating current signals S1 and S2. Thus, performance of long-distance transmission of each alternating current signal can be ensured at a maximum.

While the invention has been described in detail, the foregoing description is in all aspects illustrative and not restrictive. It is understood that numerous other modifications and variations can be devised without departing from the scope of the invention.

What is claimed is:

1. An optical modulator for outputting an optical signal which is modulated based on a plurality of alternating current signals, the optical modulator comprising:
    a Mach-Zehnder type optical interference system, formed on an electro-optic crystal, including a first optical waveguide and a second optical waveguide;
    a first electrode operable to apply, to the first optical waveguide of the Mach-Zehnder type optical interference system, a first electric signal based on a first alternating current signal;
    a second electrode operable to apply, to the second optical waveguide of the Mach-Zehnder type optical interference system, a second electric signal based on a second alternating current signal having a different frequency from the first alternating current signal; and
    a bias setting section operable to set average direct current levels of the first and second electric signals based on signal frequency information which indicates a magnitude relation between a maximum frequency of the first alternating current signal and a maximum frequency of the second alternating current signal.

2. An optical modulator for outputting an optical signal which is modulated based on a plurality of alternating current signals, the optical modulator comprising:
    a Mach-Zehnder type optical interference system, formed on an electro-optic crystal, including a first optical waveguide and a second optical waveguide;
    a first electrode operable to apply, to the first optical waveguide of the Mach-Zehnder type optical interference system, a first electric signal based on a first alternating current signal;
    a second electrode operable to apply, to the second optical waveguide of the Mach-Zehnder type optical interference system, a second electric signal based on a second alternating current signal having a different frequency from the first alternating current signal;
    a first direct current electrode operable to apply a direct current voltage to the first optical wave guide;
    a second direct current electrode operable to apply a direct current voltage to the second optical waveguide; and
    a bias setting section operable to set, based on signal frequency information which indicates a magnitude relation between a maximum frequency of the first alternating current signal and a maximum frequency of the second alternating current signal, an electric potential difference given to the first and second direct current electrodes.

3. The optical modulator according to claim 1, wherein
    the bias setting section sets the average current direct levels so that a phase of a first optical signal, modulated by the first optical waveguide, proceeds in comparison to a phase of a second optical signal, modulated by the second optical waveguide, when the maximum frequency of the first electric signal is higher than that of the second electric signal, and sets the average current direct levels so that the phase of the first optical signal, modulated by the first optical waveguide, delays in comparison to the phase of the second optical signal, modulated by the second optical waveguide, when the maximum frequency of the first electric signal is lower than that of the second electric signal, and
    the Mach-Zehnder type optical interference system outputs an output optical signal which is transmitted through a transmission path having a positive dispersion characteristic throughout the entire transmission path.

4. The optical modulator according to claim 1, wherein
    the bias setting section sets the average current direct levels so that a phase of a first optical signal, modulated by the first optical waveguide, delays in comparison to a phase of a second optical signal, modulated by the second optical waveguide, when the maximum frequency of the first electric signal is higher than that of the second electric signal, and sets the average current direct levels so that the phase of the first optical signal, modulated by the first optical waveguide, proceeds in comparison to the phase of the second optical signal, modulated by the second optical waveguide, when the maximum frequency of the first electric signal is lower than that of the second electric signal, and
    the Mach-Zehnder type optical interference system outputs an output optical signal which is transmitted through a transmission path having a negative dispersion characteristic throughout the entire transmission path.

5. The optical modulator according to claim 3, wherein the bias setting section sets the average current direct levels so as to satisfy the equation, $$2n\pi < \theta1 - \theta2 < (2n+1)\pi$$

when the maximum frequency of the first electric signal is higher than that of the second electric signal, and the bias setting section sets the average current direct levels so as to satisfy the equation, $$(2n-1)\pi < \theta1 - \theta2 < 2n\pi$$

when the maximum frequency of the first electric signal is lower than that of the second electric signal, where θ1 denotes the phase of the first optical signal modulated by the first optical waveguide, θ2 denotes the phase of the second optical signal modulated by the second optical waveguide, and n denotes an integer number.

6. The optical modulator according to claim 4, wherein the bias setting section sets the average current direct levels so as to satisfy the equation, $$(2n-1)\pi < \theta1 - \theta2 < n2\pi$$

when the maximum frequency of the first electric signal is higher than that of the second electric signal, and the bias setting section sets the average current direct levels so as to satisfy the equation, $$2n\pi < \theta1 - \theta2 < (2n+1)\pi$$

when the maximum frequency of the first electric signal is lower than that of the second electric signal, where θ1 denotes the phase of the first optical signal modulated by the first optical waveguide, θ2 denotes the phase of the second optical signal modulated by the second optical waveguide, and n denotes an integer number.

7. The optical modulator according to claim 1, further comprising:

a frequency detection section operable to detect frequencies of the first and second alternating current signals, and output values of the detected frequencies as the signal frequency information to the bias setting section.

8. An optical modulator for outputting an optical signal which is modulated based on a plurality of alternating current signals, the optical modulator comprising:

a Mach-Zehnder type optical interference system, formed on an electro-optic crystal, including a first optical waveguide and a second optical waveguide;

a signal switch section operable to input a first alternating current signal and a second alternating current signal, having a frequency which is different from a frequency of the first alternating current signal, and to switch the elements to which the first and second alternating current signals are output;

a first electrode operable to apply a first electric signal to the first optical waveguide of the Mach-Zehnder type optical interference system based on one of the first and second alternating current signals; and a second electrode operable to apply a second electric signal to the second optical waveguide of the Mach-Zehnder type optical interference system based on the other of the first and second alternating current signals.

9. The optical modulator according to claim 8, wherein the signal switch section switches, based on signal frequency information which indicates a magnitude relation between a maximum frequency of the first alternating current signal and a maximum frequency of the second alternating current signal, the elements to which the first and second alternating current signals are outputted.

10. The optical modulator according to claim 9, further comprising:

a frequency detection section operable to detect frequencies of the first and second alternating current signals, and output values of the detected frequencies as the signal frequency information to the signal switch section.

11. An optical modulator for outputting an optical signal which is modulated based on a plurality of alternating current signals, the optical modulator comprising:

a signal combination section operable to generate a first combined signal into which a first alternating current signal and a second alternating current signal, having a frequency different from a frequency of the first alternating current signal, are combined with a first ratio, which is determined by signal frequency information indicating a magnitude relation between a maximum frequency of the first alternating current signal and a maximum frequency of the second alternating current signal, and a second combined signal into which the first alternating current signal and the second alternating current signal are combined with a second ratio, which is reverse to the first ratio;

a Mach-Zehnder type optical interference systems formed on an electro-optic crystal, including a first optical waveguide and a second optical waveguide;

a first electrode operable to apply a first electric signal to the first optical waveguide of the Mach-Zehnder type optical interference system based on the first combined signal; and a second electrode operable to apply a second electric signal to the second optical waveguide of the Mach-Zehnder type optical interference system based on the second combined signal.

12. The optical modulator according to claim 11, further comprising:

a frequency detection section operable to detect frequencies of the first and second alternating current signals, and output values of the detected frequencies as the signal frequency information to the signal combination section.

13. An optical modulation method for outputting an optical signal which is modulated based on a plurality of alternating current signals, the optical modulation method comprising, with respect to a Mach-Zehnder type optical interference system, formed on an electro-optic crystal, including a first optical waveguide and a second optical waveguide:

applying an electric signal, based on a first alternating current signal, to an electrode of the first optical waveguide of the Mach-Zehnder type optical interference system;

applying, to an electrode of the second optical waveguide of the Mach-Zehnder type optical interference system, an electric signal based on a second alternating current signal having a frequency which is different from a frequency of the first alternating current signal; and setting, based on signal frequency information indicating a magnitude relation between a maximum frequency of the first alternating current signal and a maximum frequency of the second alternating current signal, average direct current levels of the first and second electric signals.

14. An optical modulation method for outputting an optical signal based on a plurality of alternating current signals, the optical modulation method comprising, with respect to a Mach-Zehnder type optical interference system, formed on an electro-optic crystal, including a first optical waveguide and a second optical waveguide:

applying an electric signal based on a first alternating current signal to an electrode of the first optical waveguide of the Mach-Zehnder type optical interference system;

applying, to an electrode of the second optical waveguide of the Mach-Zehnder type optical interference system, an electric signal based on a second alternating current signal having a different frequency from the first alternating current signal; and setting, based on signal frequency information indicating a magnitude relation between a maximum frequency of the first alternating current signal and a maximum frequency of the , second alternating current signal, an electric potential difference given to the first and second direct current electrodes.

\* \* \* \* \*

UNITED STATES PATENT AND TRADEMARK OFFICE
CERTIFICATE OF CORRECTION

PATENT NO. : 7,660,027 B2 Page 1 of 1
APPLICATION NO. : 11/935744
DATED : February 9, 2010
INVENTOR(S) : Tsutomu Niiho et al.

It is certified that error appears in the above-identified patent and that said Letters Patent is hereby corrected as shown below:

In column 16, claim 11, line 28, "systems" should read --system,--.

In column 18, claim 14, line 7, "the , second" should read --the second--.

Signed and Sealed this

Twenty-ninth Day of June, 2010

David J. Kappos
*Director of the United States Patent and Trademark Office*